(12) United States Patent
Wang et al.

(10) Patent No.: US 7,883,322 B2
(45) Date of Patent: Feb. 8, 2011

(54) CONE CONNECTED TORQUE CONVERTER

(75) Inventors: Wei Wang, Irvine, CA (US); Bruno Mueller, Sasbach (DE); Manfred Homm, Buehl-Neusatz (DE); Jeffrey Hemphill, Copley, OH (US); Philip George, Wooster, OH (US); Wolfgang Reik, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 767 days.

(21) Appl. No.: 11/637,325

(22) Filed: Dec. 12, 2006

(65) Prior Publication Data

US 2007/0144160 A1    Jun. 28, 2007

Related U.S. Application Data

(60) Provisional application No. 60/753,131, filed on Dec. 22, 2005.

(51) Int. Cl.
*F16D 33/00* (2006.01)
(52) U.S. Cl. .................. 416/180; 416/197 C; 60/330
(58) Field of Classification Search ............... 415/180, 415/197 C; 416/224; 192/3.21, 3.28, 3.29; 476/67
See application file for complete search history.

(56) References Cited

U.S. PATENT DOCUMENTS

| | | | | |
|---|---|---|---|---|
| 1,979,561 A | * | 11/1934 | Lewis | .................. 476/72 |
| 4,045,918 A | * | 9/1977 | Freedman | .................. 451/328 |
| 4,435,998 A | * | 3/1984 | Kinoshita | .................. 476/61 |
| 5,616,002 A | * | 4/1997 | Gartner | .................. 416/180 |
| 6,012,558 A | * | 1/2000 | Kundermann | .................. 192/3.29 |
| 6,216,837 B1 | | 4/2001 | Maienschein et al. | |
| 7,150,148 B2 | * | 12/2006 | Takabayashi | .................. 60/364 |
| 7,350,352 B2 | * | 4/2008 | Iwao et al. | .................. 60/330 |

* cited by examiner

*Primary Examiner*—Edward Look
*Assistant Examiner*—Ryan H Ellis
(74) *Attorney, Agent, or Firm*—Simpson & Simpson, PLLC

(57) ABSTRACT

The present invention broadly comprises a cone connection assembly for a torque converter, including: a first surface operatively arranged for connection to a crankshaft and a second surface on a cover of the torque converter. The first and second surfaces are arranged to be engaged and the first surface is arranged to transfer torque to the second surface via the engagement of the first and second surfaces. In some aspects, the crankshaft comprises a longitudinal axis, the first surface is disposed about the longitudinal axis, the cover comprises an outside surface, and the outside surface comprises the second surface. In some aspects, the first and second surfaces are arranged to be frictionally engaged or the first and second surfaces have complementary surface features and the first and second surface features are arranged to interlockingly engage.

4 Claims, 4 Drawing Sheets

CONE CONNECTED TORQUE CONVERTER

CROSS-REFERENCE TO RELATED APPLICATIONS

This application claims the benefit under 35 U.S.C. §119(e) of U.S. Provisional Application No. 60/753,131, filed Dec. 22, 2005.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a cone connection between a crankshaft for the driving unit and a housing for a torque converter.

BACKGROUND OF THE INVENTION

It is known to use a flex plate to connect a crankshaft to a torque converter in order to transfer torque from a drive unit to the torque converter. Typically the flex plate is bolted to the crankshaft and is connected to a housing for the torque converter using lugs and bolts. Pilots are typically needed to guide alignment. The torque from the crankshaft is then transferred through the flex plate and bolts to the housing. There are numerous variations of this basic arrangement, but in general, these variations use some combination of the preceding components. Unfortunately, the preceding arrangement requires a relatively large number of components, such as cover lugs, crank bolts, converter bolts, and flex plates and involves a relatively large number of alignment and fastening tasks, all of which act to increase the cost of producing and assembling the torque converter and crankshaft interface.

Thus, there is a long-felt need for reducing parts in a torque converter, particularly parts, such as lugs, bolts, and pilots, associated with the transfer of torque to the converter. Further, there is a long-felt need to reduce the time, complexity, and cost associated with installing a torque converter in a vehicle.

BRIEF SUMMARY OF THE INVENTION

The present invention broadly comprises a cone connection assembly for a torque converter, including: a first surface operatively arranged for connection to a crankshaft and a second surface on a cover of the torque converter. The first and second surfaces are arranged to be engaged and the first surface is arranged to transfer torque to the second surface via the engagement of the first and second surfaces. In some aspects, the crankshaft comprises a longitudinal axis, the first surface is disposed about the longitudinal axis, the cover comprises an outside surface, and the outside surface comprises the second surface. In some aspects, the first and second surfaces are arranged to be frictionally engaged or the first and second surfaces have complementary surface features and the first and second surface features are arranged to interlockingly engage. In some aspects, the complementary surface features are selected from the group consisting of splines, notches, tabs, indents, and coined slots.

In some aspects, the first surface defines a recess or the first and second surfaces are complementarily tapered. In some aspects, the assembly includes a taper element operatively connected to the cover and including the second surface. The first surface defines a recess. In some aspects, the taper element is fixedly connected to the cover. In some aspects, the taper element is riveted to the cover or the taper element is integral to the cover. In some aspects, the assembly includes a plate connected to the crankshaft and including the first surface. In some aspects, the first and second surfaces are complimentarily tapered and at least a portion of the cover is arranged to be inserted in the plate.

The present invention also broadly comprises a cone connection assembly for a torque converter, including: a plate connected to a crankshaft, the plate comprising a first surface radially disposed about a longitudinal axis for the crankshaft and an outside surface of a cover for the torque converter. The surface and the outside surface are complimentarily tapered, at least a portion of the cover is arranged to be inserted in the plate, the surface and the outside surface are arranged to be frictionally engaged, and the surface is arranged to transfer torque to the outside surface due to the frictional engagement.

The present invention further broadly comprises a method for transmitting torque from a crankshaft to a torque converter.

It is a general object of the present invention to provide a cone connection assembly to transfer torque from a crankshaft to a torque converter that is simple, cost-effective, and easier to install.

It is another object of the present invention to provide a cone connection assembly to transfer torque from a crankshaft to a torque converter that has fewer parts.

It is yet another object of the present invention to provide a cone connection assembly, to transfer torque from a crankshaft to a torque converter that does not rely on lugs and bolts.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
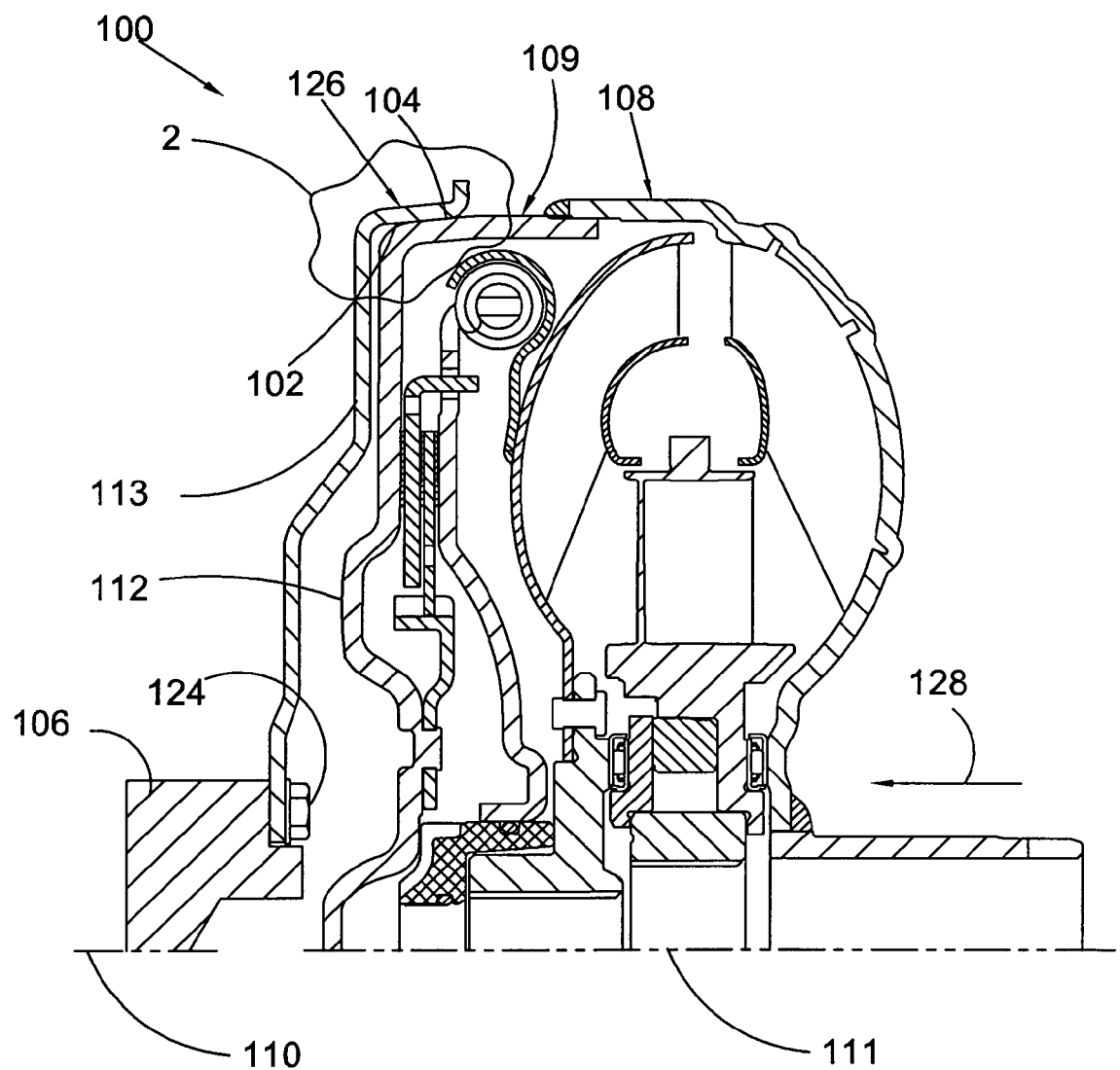
FIG. 1 is a partial cross-sectional view of a present invention cone connection assembly.

FIG. 1 is a partial cross-sectional view of present invention cone connection assembly 100. Assembly 100 includes surface 102 and 104. Surface 102 is operatively connected to crankshaft 106 and surface 104 is operatively connected to torque converter 108, for example, to cover 109 of the torque converter. In some aspects, surface 102 is integral to the crankshaft. By integral we mean that the surface is formed from a same piece of material as the crankshaft. In some aspects (not shown), surface 102 is formed separately from the crankshaft and fixedly secured to the crankshaft. In some aspects, surface 102 is disposed about axis 110 of crankshaft 106 and surface 104 is disposed about axis 111 of converter 108. In some aspects, axis 110 and 111 are aligned. In the descriptions that follow, axis for a crankshaft and a torque converter, respectively, are assumed to be aligned. However, it should be understood that the present invention is not limited to cases in which these axis are in alignment. Surfaces 102 and 104 are arranged to be engaged one with the other. By engaged, we mean that the surfaces are in contact and remain in contact by forces associated with the surfaces. Alternately stated, ancillary fasteners, such as bolts, are not used to maintain contact between the surfaces. Surface 102 transfers torque applied to shaft 106 via the engagement or contact of surface 102 with surface 104. That is, as surface 102 rotates, surface 104 rotates with the surface 102 due to the contact between the surfaces. For example, as torque is applied to crankshaft 106, for example, by a drive unit (not shown), crankshaft 106 rotates and surface 102 rotates, causing surface 104 to rotate.

In some aspects, outside surface 112 of the cover forms, or includes, surface 104. In some aspects, surfaces 102 and 104 are frictionally engaged. That is, frictional force developed between the surfaces as the surfaces are in contact, causes the surfaces to remain engaged. In some aspects (not shown), surfaces 102 and 104 have complementary surface features that interlock to engage the surfaces. By complimentary, we mean that a feature in surface 102 has a mirror component in surface 104. For example, a spline in surface 102 is configured to engage a notch on surface 104. In these aspects, the surfaces still remain in contact due to forces associated with the surfaces, rather than ancillary fasteners. Thus, the tangential/rotational forces associated with the spline are transferred to the notch by the surface contact between the spline and the notch. In general, the surface features can includes any type known in the art, including, but not limited to splines, notches, tabs, indents, and coined slots.

Figure 2:
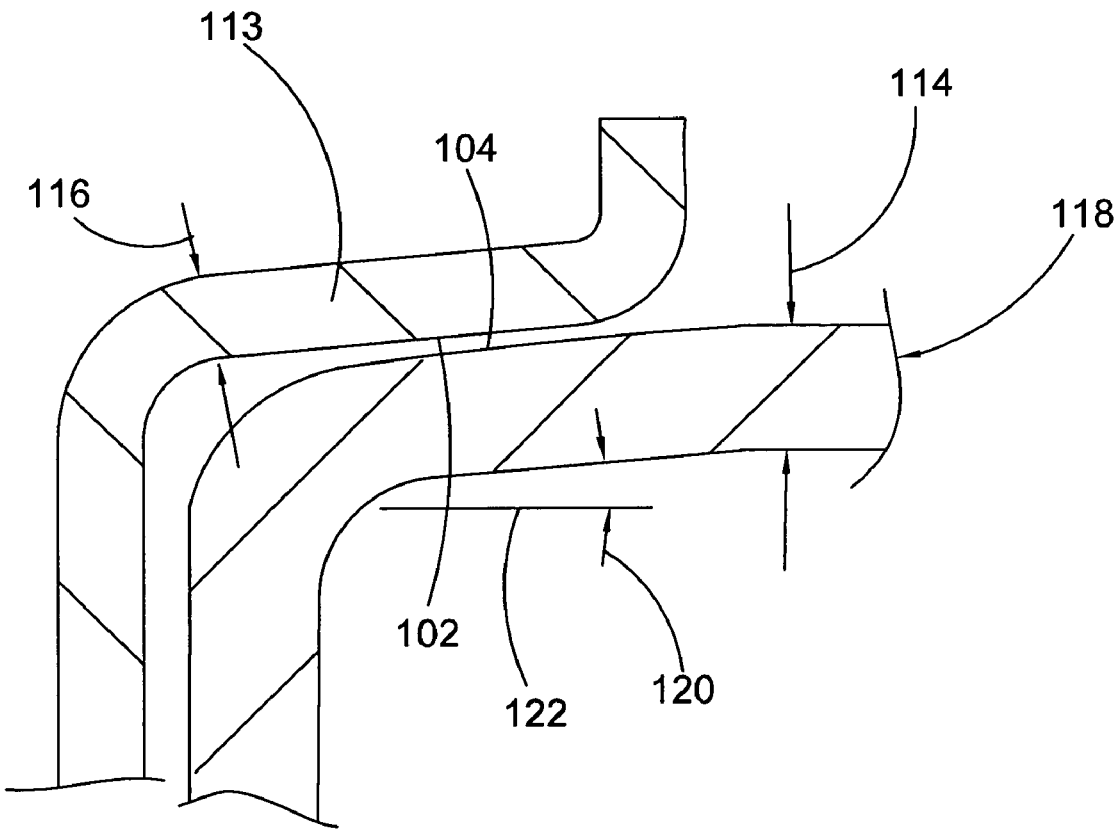
FIG. 2 is a partial cross-section of the cone connection assembly in FIG. 1.

FIG. 2 is a partial cross-section of cone connection assembly 100 in FIG. 1. The following should be viewed in light of FIGS. 1 and 2. In some aspects, surfaces 102 and 104 are radially disposed about axis 110 and 111, respectively. That is, the surfaces form planes substantially radial with respect to axis 110 and 111, respectively. For example, surface 104 can be thought of as forming a substantially cone-shaped surface with respect to axis 111.

In some aspects, surfaces 102 and 104 are complimentarily tapered. By complementarily tapered we mean that the surfaces are both sloped in the same direction. For example, the taper between surface 102 and 104 is shown in FIG. 2. In some aspects, plate 113 is connected to crankshaft 106 and surface 102 is disposed upon the plate. For purposes of illustration, we assume that thickness 114 and 116 are uniform with respect to cover 109 and plate 113, respectively, and surfaces 102 and 104 are substantially parallel. However, it should be understood that other configurations are possible and applicable. Angle 120, formed with respect to line 122, parallel to axis 111, represents the taper of surfaces 104 and 102. As can be seen, as cover 109 and plate 113 are brought together, the mutual tapering of surfaces 102 and 104 affects an engagement of the surfaces. The degree of angle 120 can be varied as desired. In some aspects, angle 120 is 2-3°, however, it should be understood that other angles are possible and included in the spirit and scope of the invention as claimed. Also, it should be understood that the tapers of surfaces 102 and 104 do not have to match. For example, the respective angles of surface 102 and 104 in FIG. 2 do not have to match. To affect the engagement shown in FIGS. 1 and 2, at least a portion of cover 109 is arranged to be inserted in plate 113. That is, plate 113 surrounds at least a portion of cover 109, specifically, the portion of cover 109 including surface 104.

The surface features and tapering described supra can be combined (not shown). For example, a tapered surface 102 and 104 can be configured with complimentary notches and splines. Such arrangements can be advantageous with respect to offsetting lash and rattle associated with the torque output from the drive unit.

In some aspects, plate 113 is bolted to the crankshaft, for example, by bolts 124. However, it should be understood that any means known in the art can be used to fasten plate 113 to the crankshaft. In some aspects, a ring gear (not shown) is mounted to surface 126. In some aspects (not shown) holes are provided in plate 113 to insert a removal device (not shown), such as a jack screw or lever, to separate plate 113 from cover 109, following the engagement of the plate and cover.

Figure 3:
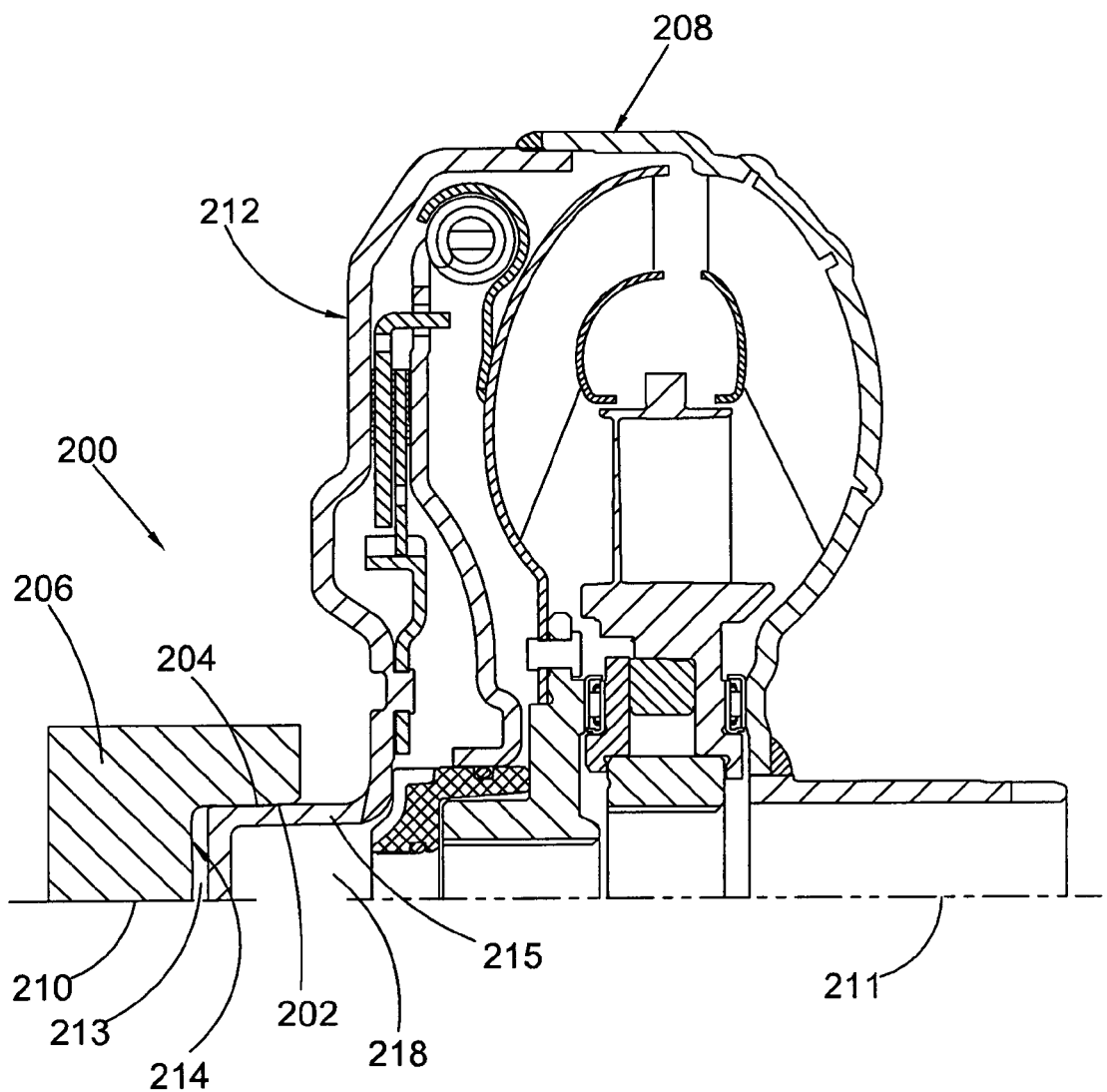
FIG. 3 is a partial cross-sectional view of a second present invention cone connection assembly; and, FIG. 4 is a partial cross-sectional view of a third present invention cone connection assembly.

FIG. 3 is a partial cross-sectional view of present invention cone connection assembly 200. The following should be viewed in light of FIGS. 1-3. The discussion regarding surfaces 102 and 104 and longitudinal axis 110 and 111 in the description for FIGS. 1 and 2 is generally applicable to surfaces 202 and 204 and axis 210 and 211 in FIG. 3. Surface 202 is operatively connected to crankshaft 206 and surface 204 is operatively connected to torque converter 208, for example, to cover 212. In general, these surfaces are arranged to be engaged. In general, the description for the engagement of surfaces 102 and 104 is applicable to surfaces 202 and 204. In some aspects, surfaces 202 and 204 are disposed about axis 210 and 211, respectively.

In some aspects, surfaces 202 and 204 are frictionally engaged. In some aspects (not shown), surfaces 202 and 204 have complementary surface features that interlock to engage the surfaces. In some aspects, recess 213 is defined by surface 214 and surface 202 is part of surface 214. By defining, we mean that surface 214 forms the interface between the recess and the element in which the recess is disposed. For example, recess 213 is formed or disposed in crankshaft 206 and surface 214 includes surface 202. In some aspects, surface 204 is part of taper element 215, operatively connected to torque converter 208. In some aspects, taper element 215 is fixedly connected to the cover. In FIG. 3, element 215 is integral to cover 212, although it should be understood that other configurations of element 215 and cover 212 are included within the spirit and scope of the invention as claimed.

In general, the discussion in the descriptions of FIGS. 1 and 2 regarding the tapering of surfaces 102 and 104 and the combination of tapering and surface features for surfaces 102 and 104 is applicable to surfaces 202 and 204, and for the sake of brevity, is not repeated here.

Figure 4:
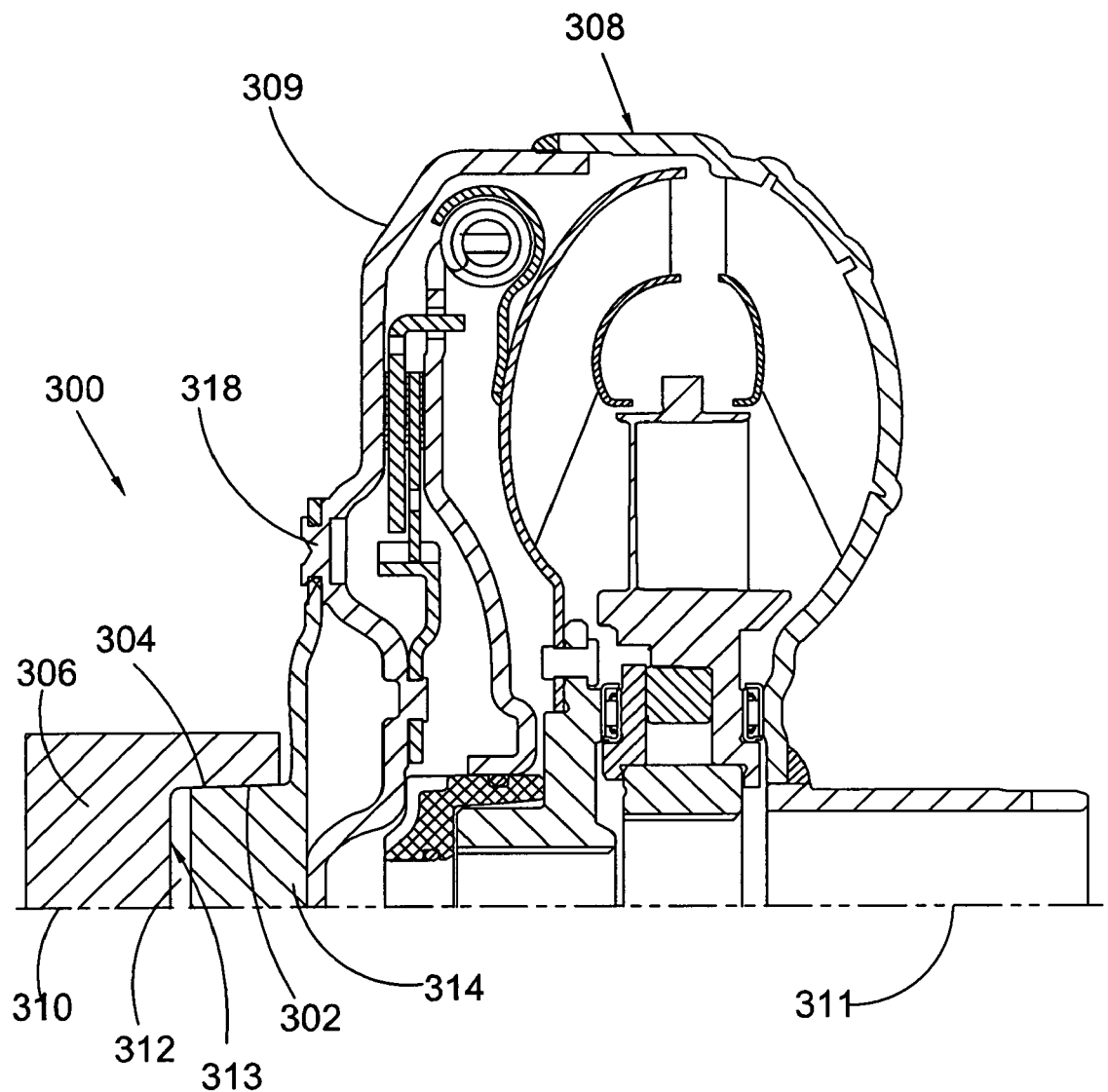

FIG. 4 is a partial cross-sectional view of present invention cone connection assembly 300. The following should be viewed in light of FIGS. 1-4. The discussion regarding surfaces 102 and 104 and axis 110 and 111 in the description for FIG. 1 is generally applicable to surfaces 302 and 304 and axis 310 and 311, respectively, in FIG. 4. Surface 302 is operatively connected to crankshaft 306 and surface 304 is operatively connected to torque converter 308, for example, to cover 309. In general, these surfaces are arranged to be engaged. In general, the description for the engagement of surfaces 102 and 104 is applicable to surfaces 302 and 304. In some aspects, surfaces 302 and 304 are disposed about axis 310 and 311, respectively.

In some aspects, surfaces 302 and 304 are frictionally engaged. In some aspects (not shown), surfaces 302 and 304 have complementary surface features that interlock to engage the surfaces. In some aspects, recess 312 is defined by surface 313 and surface 302 is part of surface 313. In some aspects, surface 304 is part of taper element 314 operatively connected to torque converter 308, for example, element 314 is fixedly connected to cover 309. In some aspects, element 314 is separate from cover 309 and connected to the cover. For example, rivets 318 connect element 314 and cover 309 in FIG. 4. However, it should be understood that other configurations of element 314 and cover 309 are included within the spirit and scope of the invention as claimed.

Element 314 has a different configuration than element 215 in FIG. 3. For example, element 215 forms a space 218, whereas element 314 is substantially solid. However, it should be understood that elements 215 and 314 are not limited to any particular configuration and other configurations are included within the spirit and scope of the invention as claimed.

In general, the discussion in the descriptions of FIGS. 1 and 2 regarding the tapering of surfaces 102 and 104 and the combination of tapering and surface features for surfaces 102 and 104 is applicable to surfaces 302 and 304, and for the sake of brevity, is not repeated here.

Referring to FIG. 1, in operation, charge pressure and centrifugal pressure in converter 108 produce an external thrust in direction 128. The thrust urges cover 109 in direction 128 and advantageously for some configurations of surface 102 and 104, causes the surfaces to more firmly engage. For example, mutually tapered surfaces 102 and 104 are further engaged by thrust in direction 128. The preceding discussion is generally applicable to converters 208 and 308 and surfaces 202 and 204 and 302 and 304, respectively. In some aspects, self-locking of respective surface pairs, for example, surfaces 102 and 104, is featured at installation to provide start-up torque. That is, surfaces 102 and 104 are engaged during installation of the respective torque converter and remain engaged so that upon application of torque to the respective crankshaft, such torque is conveyed to surface 104 through surface 102. For example, axial insertion force translates into radial stress, which in combination with the elasticity of the respective materials comprising surfaces 102 and 104, wedges surfaces 102 and 104 together. Alternately stated, surfaces 102 and 104 do not need to be re-engaged after installation of the respective torque converter.

In some aspects (not shown), the cone/recess arrangement shown in the figures can be reversed. For example, an element containing a recess can be attached to the torque converter and a taper element can be connected to the crankshaft. In these aspects, the slope or taper of the surfaces would be "opposite" of the taper shown in FIGS. 3 and 4, for example. In some aspects, the angle of the taper of surfaces pairs 102 and 104, 202 and 204, or 302 and 304, respectively, is 2-3°, however, it should be understood that other angles are possible and such angles are within the spirit and scope of the invention as claimed.

Surfaces 102 and 104, 202 and 204, or 302 and 304 can be treated to enhance the contact between the surfaces. For example, to increase frictional force between respective surfaces, one or both of a pair of surfaces can be coated with a frictional material, for example, nickel plating with diamond particles. It should be understood that any frictional coating known in the art can be used.

In some aspects (not shown), plate 113 and cover 109 are configured with complimentary protrusions and indents on respective horizontal portions of the plate and cover. The protrusions and indents are configured to matingly engage as plate 113 and cover 109 are brought into contact. As described supra regarding surface features, the protrusions and indents transfer torque due to the engagement of the surfaces of the protrusions and indents. The protrusions and indents can be of any type known in the art. For example, plate 113 could have a series of tabs about its outer circumference that engage indents on cover 109. The plate and cover can be loaded to maintain the contact between the tabs and indents or the external thrust load from converter 108 can provide force to keep the tabs and indents engaged. Returning to FIGS. 3 and 4, in like manner, horizontal faces of the crankshaft and taper element can have complimentary and engagable protrusions and indents. It should be understood that the present invention is not limited to any positioning, number, or configuration of protrusions and indents.

The present invention advantageously eliminates the use of numerous component parts such as cover lugs, rank bolts, converter bolts, and flex plates. In addition, the taper element can be used as a pilot during installation, further reducing parts count and simplifying installation.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A cone connection assembly for a torque converter, comprising:
   a cover for a torque converter; and,
   a taper element separate from the cover and rotationally fixed with respect to the cover and including a surface operatively arranged for frictional engagement with a crankshaft so that the surface transfers torque from the crankshaft to the cover via the engagement of the surface with the crankshaft.

2. The assembly of claim 1 wherein said taper element is riveted to said cover.

3. A cone connection assembly for a torque converter, comprising:
   a plate arranged for fixed connection to a crankshaft and including a radially inwardly facing surface;
   a cover for a torque converter; and,
   a radially outwardly facing surface for the cover operatively arranged for frictional engagement with the radially inwardly facing surface so that the plate transfers torque from the crankshaft to the cover via the engagement of the radially inwardly facing surface with the radially outwardly facing surface, wherein the radially inwardly facing surface and the radially outwardly facing surface are tapered in opposite directions, respectively, wherein the plate and the cover are only in contact at the radially inwardly facing surface and the radially outwardly facing surface, and wherein the torque converter includes an impeller shell.

4. A cone connection assembly for a torque converter, comprising:
   a first portion of a cover for a torque converter, the first portion connected to an impeller shell for the torque converter; and,
   a radially outwardly facing surface for the cover operatively arranged for frictional engagement with a radially inwardly facing surface of a crankshaft so that the radially outwardly facing surface transfers torque from the crankshaft to the cover via the engagement of the radially outwardly facing surface with the radially inwardly facing surface, wherein the cover is arranged to contact the crankshaft only at the radially inwardly facing surface.

* * * * *